(12) United States Patent
Aiello et al.

(10) Patent No.: US 6,496,808 B1
(45) Date of Patent: Dec. 17, 2002

(54) USING SMARTCARDS TO ENABLE PROBABILISTIC TRANSACTION ON AN UNTRUSTED DEVICE

(75) Inventors: William A. Aiello, Madison, NJ (US); Aviel D. Rubin, West Caldwell, NJ (US); Martin J. Strauss, Summit, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/412,354

(22) Filed: Oct. 5, 1999

Related U.S. Application Data

(60) Provisional application No. 60/113,308, filed on Dec. 22, 1998.

(51) Int. Cl.[7] .............................................. G06F 17/00
(52) U.S. Cl. .................... 705/67; 713/200; 380/228
(58) Field of Search .............................. 235/380, 379; 902/9; 713/200, 201, 171, 162, 187; 705/71, 67, 64; 380/228, 239, 229, 269, 272, 273

(56) References Cited

U.S. PATENT DOCUMENTS

| | | | | |
|---|---|---|---|---|
| 5,548,648 A | * | 8/1996 | Yorke-Smith | 380/49 |
| 5,563,950 A | * | 10/1996 | Easter et al. | 380/30 |
| 5,721,777 A | * | 2/1998 | Blaze | 380/4 |
| 5,781,458 A | * | 7/1998 | Gilley | 364/717.06 |
| 5,970,143 A | * | 10/1999 | Schneier et al. | 380/23 |

FOREIGN PATENT DOCUMENTS

JP          410336744 A   * 12/1998

OTHER PUBLICATIONS

Derwent–ACC–No: 1996–302750; Mueller, K, H.*

* cited by examiner

Primary Examiner—James P. Trammell
Assistant Examiner—Pierre E. Elisca

(57) ABSTRACT

The present method permits a user to conduct remote transactions without a network while using an untrusted computing device, such as a hand-held personal digital assistant or a laptop computer. The computing device is augmented with a smartcard reader, and the user obtains a smartcard and connects it to the device. This design can be used by an untrusted user to perform financial transactions, such as placing bets on the outcome of a probabilistic computation. Protocols are presented for adding (purchasing) or removing (selling) value on the smartcard, again without requiring a network connection. Using the instant protocols, neither the user nor the entity issuing the smartcards can benefit from cheating.

4 Claims, 5 Drawing Sheets

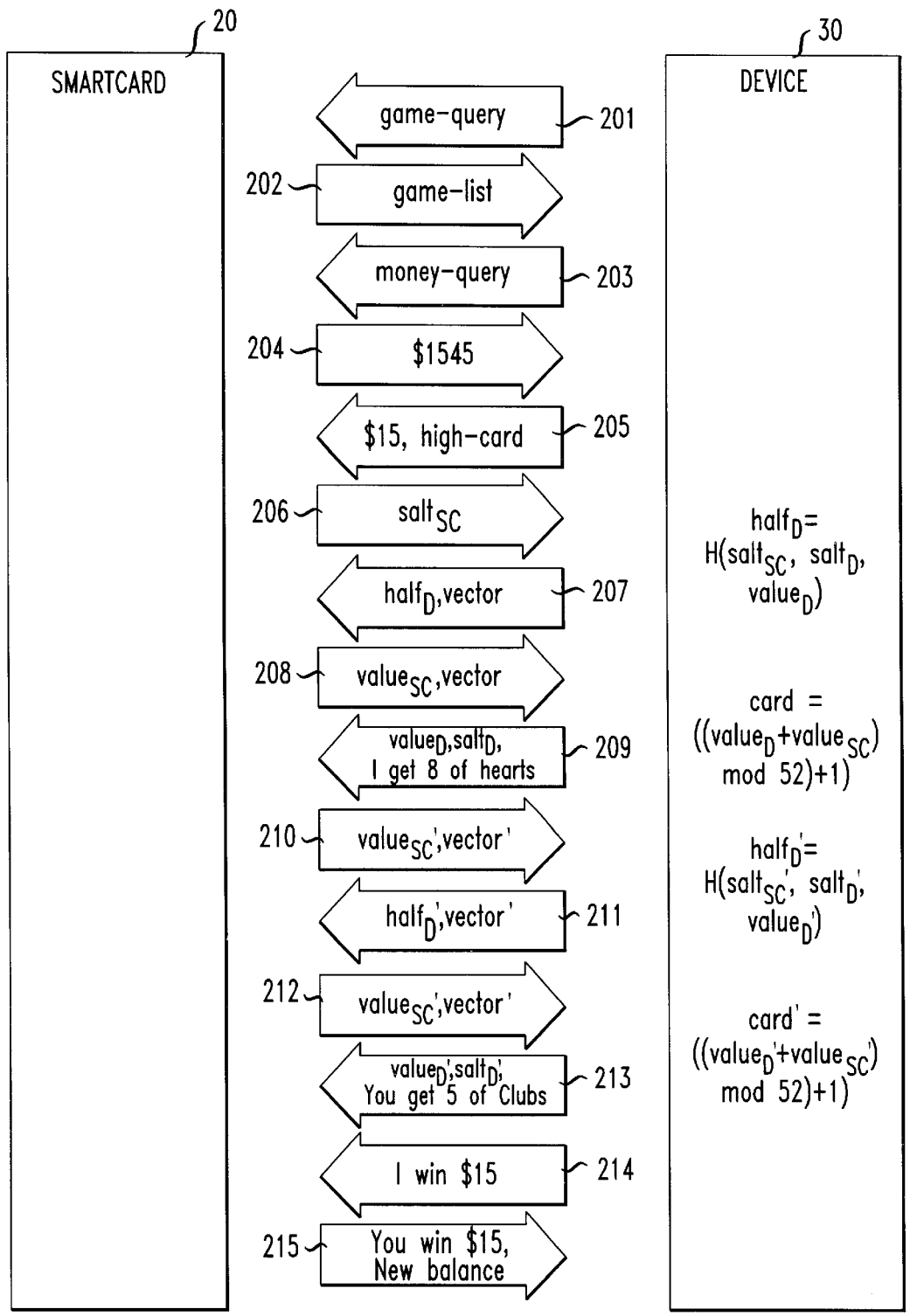

Fig. 3

| 1 Ace of Spades   | 14 Ace of Hearts   | 27 Ace of Diamonds   | 40 Ace of Clubs   |
|---|---|---|---|
| 2 Two of Spades   | 15 Two of Hearts   | 28 Two of Diamonds   | 41 Two of Clubs   |
| 3 Three of Spades | 16 Three of Hearts | 29 Three of Diamonds | 42 Three of Clubs |
| 4 Four of Spades  | 17 Four of Hearts  | 30 Four of Diamonds  | 43 Four of Clubs  |
| 5 Five of Spades  | 18 Five of Hearts  | 31 Five of Diamonds  | 44 Five of Clubs  |
| 6 Six of Spades   | 19 Six of Hearts   | 32 Six of Diamonds   | 45 Six of Clubs   |
| 7 Seven of Spades | 20 Seven of Hearts | 33 Seven of Diamonds | 46 Seven of Clubs |
| 8 Eight of Spades | 21 Eight of Hearts | 34 Eight of Diamonds | 47 Eight of Clubs |
| 9 Nine of Spades  | 22 Nine of Hearts  | 35 Nine of Diamonds  | 48 Nine of Clubs  |
| 10 Ten of Spades  | 23 Ten of Hearts   | 36 Ten of Diamonds   | 49 Ten of Clubs   |
| 11 Jack of Spades | 24 Jack of Hearts  | 37 Jack of Diamonds  | 50 Jack of Clubs  |
| 12 Queen of Spades| 25 Queen of Hearts | 38 Queen of Diamonds | 51 Queen of Clubs |
| 13 King of Spades | 26 King of Hearts  | 39 King of Diamonds  | 52 King of Clubs  |

USING SMARTCARDS TO ENABLE PROBABILISTIC TRANSACTION ON AN UNTRUSTED DEVICE

This application claims the benefit of Provisional application Ser. No. 60/113,308, filed Dec. 22, 1998.

FIELD OF THE INVENTION

The present invention relates to electronic transactions and, more particularly, to systems for conducting electronic transactions with a cryptographic module.

BACKGROUND OF THE INVENTION

When users have access to a communication network, then applications for conducting electronic commerce transactions such as banking, shopping, and gambling can be implemented securely in a straightforward manner. This is because the resources that need protection, namely money, can be secured by cryptographic means in the network. There are many protocols for conducting secure transactions on the Internet, such as the Secure Sockets Layer (SSL) which permits electronic commerce by providing an encryption layer between the application/browser layer and the Internet's TCP/IP layer. (See Kipp E. B. Hickman and Taher Elgamal, The SSL Protocol, Internet draft draft-hickman-netscape-ssl-01.txt, 1995). Secure protocols are already implemented on many mobile devices. Hall et al. have presented protocols for remote electronic gambling for online users. (See Chris Hall and Bruce Schneier, "Remote Electronic Gambling," 13$^{th}$ Annual Computer Security Applications Conference, pages 227–30, December 1997).

There are, however, many occasions when a user is in possession of a small computing device, but is not in communication with the network. There is currently a proliferation of lightweight handheld devices, such as the 3Com Palm Pilot, Windows CE devices, and even laptops that weight under three pounds. Many of these devices are so portable that people can carry them in their pockets and use them at all times—while in a vehicle travelling, while in a public place, standing in line at a grocery store, sitting at a doctor's office, etc. In such scenarios, it is difficult to allow the user to perform financial transactions because interaction with servers is difficult or not possible. Moreover, it is assumed that the user has full access to the device, so secrets (such as cryptographic keys) cannot be safely stored on it. Accordingly, the prior art does not enable a user to securely conduct electronic transactions on an untrusted remote electronic device.

SUMMARY OF THE INVENTION

The present invention permits a user to conduct remote transactions without a network while using an untrusted computing device, such as a hand-held personal digital assistant or a laptop computer. The computing device is augmented with a smartcard reader, and the user obtains a smartcard and connects it to the device. This design can be used by an untrusted user to perform financial transactions, such as placing bets on the outcome of a probabilistic computation. Protocols are presented for adding (purchasing) or removing (selling) value on the smartcard, again without requiring a network connection. Using the instant protocols, neither the user nor the entity issuing the smartcards can benefit from cheating.

The protocols described below have numerous advantages over the prior art and satisfy the following security requirements, particularly as applied to gambling applications: (1) only the issuer of the smartcards is able to add or subtract money from the smartcard without participating in any particular transaction; (2) the issuer must refund the amount on the smartcard whenever the user wishes; (3) once a user commits an amount to a transaction or places a bet on a game, she cannot prevent the loss of that amount if she loses; (4) the user can detect a fraudulent transaction such as when she wins a game but is not credited for her bet; (5) the issuer must publicize the algorithms and probabilities that are actually used by the smartcard (e.g. the house must announce the rules for each game and it must be impossible for the smartcard to weigh the probability further in favor of the house); (6) the issuer can set limits on transactions on the smartcard (e.g. placing limits on bets); and (7) the user cannot risk more than the amount on the smartcard in any transaction. Thus, with respect to gambling, the user can play probabilistic games with assurance that if she wins, she will actually win the money in the bet, and the house knows that users will not be able to cheat. In addition, the user is guaranteed that the odds of winning published by the smartcard are accurate.

These and other advantages of the invention will be apparent to those of ordinary skill in the art by reference to the following detailed description and the accompanying drawings.

BRIEF DESCRIPTION OF THE DRAWINGS

FIGS. 2, 5, and 6 illustrate security protocols that may be used to implement the principles of the present invention.

FIG. 3 illustrates a possible mapping between integers and the values of a deck of cards.

FIG. 4 illustrates an example vector for use with the above protocols.

DETAILED DESCRIPTION

Figure 1:
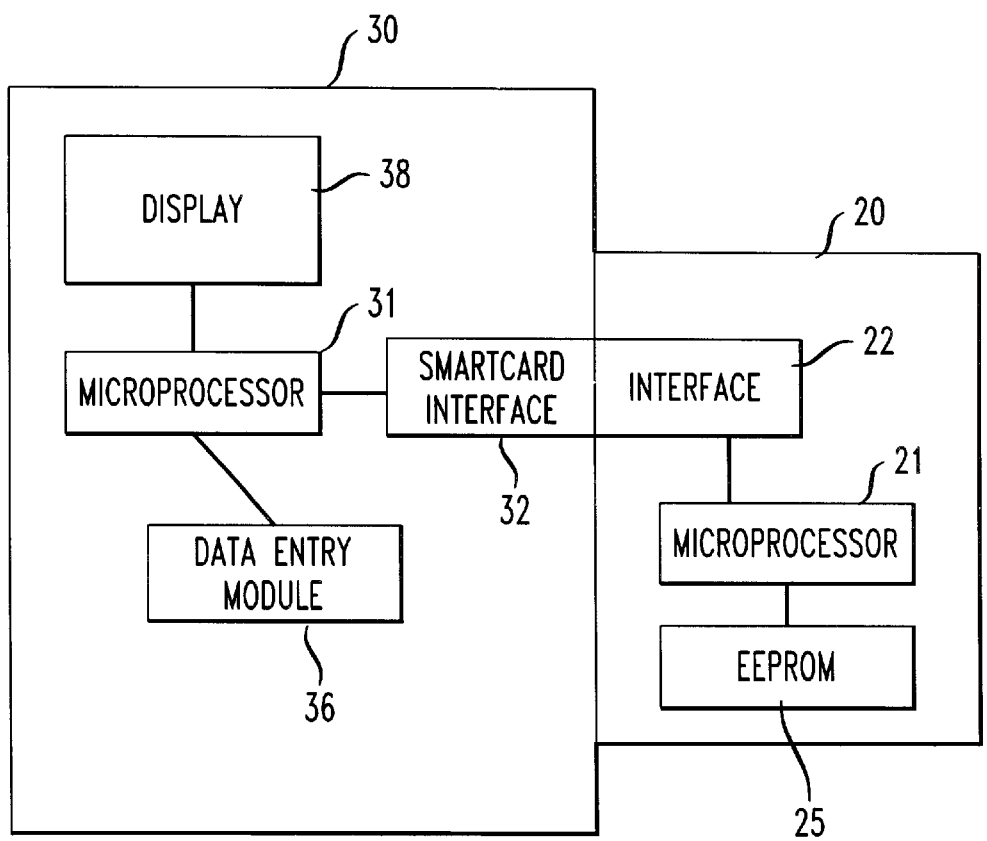
FIG. 1 is an illustrative representation of the major functional components of a portable cryptographic module and its interaction with a remote computing device.

FIG. 1 illustrates in block diagram format a system designed in accordance with the principles of the present invention. The block diagram of FIG. 1 shows two main components, namely a portable cryptographic module such as a smartcard 20 and a remote computing device 30. The design of the device/smartcard combination in FIG. 1 permits a user to conduct a remote transaction—such as gambling—with the entity that issued the smartcard 20 (hereinafter referred to as the "house"). The user is in possession of the remote computing device 30 and purchases smartcards 20 from the house with value stored on them. The house not only issues smartcards with value on them in exchange for money, it is also responsible for redemption of money on smartcards. It is assumed that there is, associated with the house, a public/private cyptographic key pair whose public component is well-known.

The smartcard 20 includes a microprocessor 21, an erasable electronic programmable read-only memory (EEPROM) 25, and an interface 22 to a card reader, which, for example, typically comprises an analog interface chip, an inductive coil of a transformer for power, and several capacitive plates, which are not shown in FIG. 1. All smartcard components are preferably laminated beneath the smartcard surface such that no external contacts are accessible to intruders. It is assumed that monetary value can be stored on the card (e.g. several thousand dollars worth) such that reading or modifying the value is more costly to the attacker than the benefit that could be derived from such an attack. The microprocessor typically has a central processing unit and internal memory units (not shown) that store the firmware for an operating system. The internal memory units of microprocessor 21 store protocols for smartcard 20 to receive and transmit data, security and application control software, and memory management programs. Operating under the control of the firmware, microprocessor 21 executes instructions to format data that is transferred to the remote transaction device 30 via the card reader/writer interface. The microprocessor 21 also interprets programmed instructions received from the remote transaction device 30 through the card reader/writer interface, as described in further detail below.

It is advantageous for the smartcard to have a serial number, imprinted visibly on the outside, and that information be placed in the smartcard's secure memory at its manufacture time that depends on both the card and the particular entity issuing the smartcard. For example, the secure memory can store a signature from the house on the card's serial number which can be utilized in connection with the security protocols discussed more fully below. The smartcard 20 advantageously has a means for generating random numbers. This can be achieved either in hardware (e.g., using a noisy diode or a low-accuracy clock) or in software/firmware (e.g., using a built-in seed and a cryptographic pseudo-random number generator). The latter would require some nonvolatile memory, where some state can be maintained over time. Ideally, some combination of these techniques can be used.

The remote computing device 30 is preferably a small portable device that is capable of computation. It can be a special-purpose device built for the instant applications or a standard portable device such as a personal digital assistant or a laptop computer. The only physical requirement is that the device needs to be able to communicate with the cryptographic module. In the present design, the remote computing device is augmented with the smartcard reader/writer interface 32, which analagously to interface 22 comprises an analog interface chip, an inductive coil of a transformer connected to a power supply, and several capacitive plates, again not shown in FIG. 1. In a preferred embodiment, the device 30 also includes a microprocessor 31, a display 38, and some form of data entry module 36. The device should also have a source of random numbers and some means such as EEPROM for storing a public cryptographic key of the house. Since the device is used to interface with the user, it preferably should have a graphical display. There are no security requirements associated with the design of the device, which can be "untrusted" to the house. As such, the device is an agent of the user. It is assumed that the user can trust the device to behave properly (in the extreme, the user can build her own device to ensure that). The functionality of the device can be fully specified so that different manufacturers can produce devices that interoperate.

The security protocols described below permit the user to gamble against the house with assurance that, if she wins, she will actually win the money in the bet and with the odds of winning known accurately beforehand. The house is likewise confident that users will not be able to cheat. It should be noted that although the security protocols and requirements are described in relation to the application of gambling, the present invention is not so limited and has application to other forms of transactions conducted remotely with the computing device.

Transaction Protocols

FIG. 2 illustrates the security protocols as applied to the simple game of "high-card." In the game of high-card, the user and the house are each dealt a card from the same deck and whoever has the highest card wins. The house wins in the case of a tie, and aces are always high. The following notation and abbreviations are used in the discussion:

| NOTATION/ABBREVIATION | DEFINITION |
| --- | --- |
| A → B: Message | A is sending Message to B |
| [text]$_{sc}$ | text is signed by the entity SC. |
| A, B | comma denotes concatenation of A and B |
| SC | smartcard |
| D | device |
| MK | master key |
| SN | serial number |

At step 201, the device 30 sends a message to the smartcard 20 requesting a list of games supported by the smartcard. The smartcard responds at step 202, with a list of games. It is assumed that the smartcard can support many different types of games with their own bet limits and odds. Thus, the following messages can be defined where the smartcard informs the device of the games that are available:

Device→Smartcard: game-query

Smartcard→Device: game-list

It is assumed that the rules along with their implied probabilities are either known or included in the list. The list of games could simply be a list of numbers that index into a booklet where games are described in detail. The booklet could be available on the device, so that the user could browse the rules before playing. For example, the game of high-card could be identified as follows:

Game: high-card

Odds: 27:24

Limit: $100 per game

The details of how games and odds are represented is not important for the present invention.

The user must have some confidence that the smartcard really has the amount of money that the user has paid the house for it. Therefore, the following query should be defined which the smartcard and the device supports:

Device→Smartcard: money-query

Smartcard→Device: value

This permits the device to prompt the smartcard for the amount of money, and the smartcard returns the current balance. At step 203 and 204, the device uses the defined query to record the balance of money left on the card (this process is useful for the transcript discussed below). At step 204, the user specifies the game she wants to play and the bet she wishes to make, and the device transmits this information to the smartcard, e.g.

Device→Smartcard: $15, high-card

At steps 206–209, the smartcard and device execute a protocol for the dealing of a random face-up card. That is, the protocol allows a card to be chosen at random from a deck such that each card is equally likely to be chosen, and there is no way for the device nor the smartcard to bias the selection. In the end, the card is known to both parties. The protocol is described with respect to a standard poker deck of 52 cards, although the protocol is easily generalized for other games as further described below. The cards in the deck are mapped to integers, as set forth in FIG. 3, so that the problem of dealing a card reduces to picking a number from 1 to 52. Thus, it can be said that the Ace of Hearts has been dealt if the number 14 is chosen. In order for a card to be dealt, the device and the smartcard run a protocol whereby they agree on a number from 1 to 52. To accomplish this, basically each side provides a random piece, and they are combined in such a way that a random choice results.

At step 206, the smartcard chooses a random number $salt_{SC}$ from 1 to $2^{160}$, and sends it to the device:

Smartcard→Device: $salt_{SC}$

The device, on the other hand, chooses a random number $salt_D$ from 1 to $2^{160}$, and another random number valued from 1 to 52. The device concatenates the three numbers and computes a one-way transformation:

$half_D = H(salt_{SC}, salt_D, value_D)$

It is assumed that for a randomly chosen $salt_D$ unknown to the smartcard, $half_D$ appears pseudo-random and thus reveals only negligible information about $value_D$ to the computationally bounded smartcard. In practice, a cryptographic hash function such as SHA1, can be utilized. At step 207, the device then sends $half_D$ to the smartcard:

Device→Smartcard: $half_D$, vector

Vector, as further described below, permits the dealing of subsequent cards from the same deck without duplication of the same card. The smartcard then chooses a random number valuesc from 1 to 52. At this point, both the smartcard and the device have committed to their values, but the smartcard does not know $value_D$ and the device does not know $value_{SC}$.

At step 208, the smartcard reveals $value_{SC}$ to the device:

Smartcard→Device: $value_{SC}$, vector

The device in turn, at step 209, sends $value_D$ and $salt_D$ to the smartcard:

Device→Smartcard: $value_D$, $salt_D$

Both sides can then compute $k = ((value_D + value_{SC}) \bmod 52) + 1$ which gives a random number from 1 to 52, the card that is dealt. In FIG. 2, the calculation results in the computation of the number _____ which deals the card 8 of Hearts to the user at step 209. It is important that the commitment made by the device in step 207 be verified by the smartcard. After the smartcard receives the message in step 209, it must check that the value submitted is the same one that was committed to earlier. To do this, the smartcard simply recomputes the hash of the two salts and the value and compares it to the value submitted in the message at step 207. It also verifies that the card chosen is the correct one, the 8 of Hearts in the example.

The device and the smartcard are, in essence, utilizing the transformation H to implement a commitment protocol. The purpose of $salt_D$ is to prevent the smartcard from computing the value chosen by the device by exhaustively searching for the preimage of H. For example, if the device simply sent $H(value_D)$ or $H(value_D, salt_{SC})$, the smartcard could compute H for each number from 1 to 52 and see which one matched. If could then force any card it wanted to as the choice by picking its value appropriately. The purpose of introducing $salt_{SC}$ is to prevent a nonuniform device from opening the commitment H( ) in two ways. For example, if the protocol requires the device to simply send $H(value_D, salt_D)$, then the device could compute, offline, values $salt_D$, $value_D$, $salt_D'$, $value_D'$, with $H(salt_D, value_D) = H(salt_D', value_D')$ but with $value_D \neq value_D' \bmod 52$. This would allow the device to affect the outcome of the dealt card calculation by choosing $value_D$ or $value_D'$ after learning $value_{SC}$. By utilizing the above protocol and a hash function for H, either the device or the smartcard can ensure that the resulting value is random and unbiased by the other party.

It should be noted that the hash function H must have a number of scrambling properties of the sort commonly assumed in the literature and commonly attributed to SHA1. In particular, the hash function needs to interact securely with other operations such as signatures and concatenation, as well as the particular rules of the card game implemented. The precise requirements of the hash function are straightforward, though tedious, to enumerate precisely. Moreover, although the above description uses a hash function to implement commitment, there are other implementations of commitment that can be used—such as those with pseudo-random number generators. Also, note that the commitment is over a secure channel between the smartcard and the device, neither of which performs simultaneous transactions with other parties. Thus, it is not necessary that the commitment protocol be non-malleable, even if several cards are dealt in parallel. This is advantageous since non-malleable commitment is inefficient.

Steps 210 to 213 in FIG. 2 parallel the above and results in the card 5 of Clubs being dealt, except that the steps deal with 51 cards instead of 52. The protocol uses a 52-bit vector to keep track of which cards have already been dealt to ensure that the same card is not drawn randomly. At steps 211 and 212 (as well as at 207 and 208), the two sides agree about which cards are still in the deck by transmitting the vector to each other. A bit in the vector is set fi the corresponding card is still in the deck, and it is a zero otherwise. Initially the vector consists of 52 ones, and is gradually populated with a zero at the appropriate position in the vector as that corresponding card is dealt. The number of 1s in the vector thus represents the number of cards remaining in the deck. The two values $value_D$ and $value_{SC}$ are chosen from 1 to n, where n is the number of one's that are in the vector. Then, once all of the messages have been exchanged, the two sides compute:

$k = ((value_D + value_{SC}) \bmod n) + 1$

The result, k, is between 1 and n, inclusive, and the card chosen corresponds to the position of the kth 1 in the vector. Thus, vector' in steps 211 and 212 would be 52-bit vector of 1s with a "0" at the __th position which corresponds, according to FIG. 3, to the Eight of Hearts. (A more complex example would be a vector with 38 ones, such as the vector set forth in FIG. 4. Assuming that the smartcard and device generate a $value_D$ of 27 and a valueSC of 18, then $k=((27+18) \bmod 38)+1=8$. The $8^{th}$ 1 is i eleventh position in the vector, so the card dealt would be the Jack of Spades.)

Accordingly, at steps 210–215 the device and the smartcard exchange the following messages and finally determines that the user has won the game and the bet:

> Smartcard→Device: salt$_{SC}$'
>
> Device→Smartcard: half$_D$', vector'
>
> Smartcard→Device value$_{SC}$', vector'
>
> Device→Smartcard: value$_D$', salt$_D$', You get 5 of Clubs
>
> Device→Smartcard: I win $15
>
> Smartcard→Device: You win $15, new balance: $1560

In practice, one could exchange the roles of the smartcard and device for the card dealing protocol in messages 210–215 to increase the number of messages sent in the same direction as previous messages. Successive messages in the same direction can also be collapsed to shorten the protocol. Another simple optimization is to deal all of the cards at once. This could easily be accomplished by combining messages at steps 206 and 210, 207 and 211, etc. To deal n cards, the size of each message increases by a factor of n, but the number of messages remains constant at four.

Moreover, the same techniques can be readily extended and used to play other games. For example, the techniques can be used to play the following:

BLACKJACK: The random deal can be used to play blackjack against the house. First, the house "deals" two face up cards to the user, using the techniques set forth above. Then, the house deals itself a card. The device can display a face down card to the user, but the cards has actually not been dealt yet, as a computational matter. The user then decides how to play her hand, and cards are dealt as required. Finally, when the user decides to hold her hand, the dealer's second card is dealt. In the device, the down card appears to flip over. Finally, any additional cards needed by the house are dealt. The signed transcript is used to settle any dispute s.

SLOTS: The technique used to deal cards can be used to pick random numbers of any size. A slot machine is easy to implement with such a tool. The pictures on each wheel of the slot machine are numbered, and the spinning of each wheel corresponds to the house "dealing" a random number in the proper range. If the slot machine displays give images, then five random numbers are agreed upon by the device and the smartcard, and the graphical user interface is used to display five pictures corresponding to the numbers chosen.

CRAPS: Rolling the dice to play craps corresponds to picking two random numbers between one and six. It is straightforward to apply the present invention to do this.

POKER: A typical poker machine can be implemented as follows. The house deals five cards to the user. The user discards up to four of them (four is only allowed if the fifth card is an ace). The house then deals cards to replace the discarded ones. If the quantity of the hand is above a certain threshold, the user wins. This again can be accomplished using the above techniques.

Digital Signatures and Message Chains

Although the above protocols provide protection against user cheating, the user is not protected against smartcard cheating, such as when the smartcard includes a bogus message as the previous message received from the device. The system design is notably asymmetric: the smartcard's protection against the user is temper-resistant hardware, whereas the user lacks equivalent protection against smartcard misbehavior. In a preferred embodiment of the present invention, protection is provided to the user through the ability of the device to provide a transcript of the communication which can be brought to an arbiter, such as a court of law or an entity mutually agreed upon by the users and the house, for dispute-resolution. The goal is for the device to store an undeniable transcript of all communication with the smartcard; that is, the house should not be able to repudiate that the messages in the transcript were sent. Non-repudiation can be achieved through the use in the protocol of signing and hash chaining.

In a preferred embodiment of the present invention, signature verification is implicitly part of the above protocol. The smartcard signs every message in the above protocol before it is sent. It is assumed that the first message from the smartcard includes the public key certificate for the smartcard signed by the house. So, in effect, every message sent by the smartcard above should be read as $[msg]_{SC}$ and the first message sent from the smartcard as $[msg]_{SC}$, $[SC, public-key(SC)]_H$ where H here represents that the smartcard's certificate and public key has been signed by the house public key. Thus, anyone in possession of the public key of the house can verify the certificate and then the signature by the smartcard. Notably, although the smartcard signs messages, the device as an untrusted agent of the user does not have to sign messages.

Finally, non-repudiation can be achieved through the use of hash chaining, a known method for linking messages to each other within a communication session. The device generates a random key, $K_D$, upon startup, and uses this key to produce a message authentication code (MAC) of messages that are sent to the smartcard. Cryptographic hash functions such as SHA1 or MD5 can be utilized to generate the MAC. Subsequent MAC computations include all previous MACs, and this is referred to as a running MAC. When the smartcard includes the previous message in its signed message, the running MAC is included as well. The running MAC is included in every message sent from the device to the smartcard and is computed over the previous message received from the smartcard, the current message being sent, and the running MAC from the previous message sent. In other words, the running MAC can be defined as follows:

> $RMAC_1, =MAC_{KD}(msg_1)$
>
> $RMAC_n=MAC_{KD}((msg_{n-1}, msg_n, RMAC_{n-2}))$ To illustrate, the communication between the device and smartcard would be as follows:

> Device→Smartcard: $x_1=msg_1$, $MAC_{KD}(msg_1)$
>
> Smartcard→Device: $x_2=[msg_2, x_1]_{SC}$
>
> Device→Smartcard: $x_3=msg_3$, $MAC_{KD}(msg_2, msg_3, MAC_{KD}(msg_1))$
>
> Smartcard→Device: $x_4=[msg_4, x_3]_{SC}$ The third message can be written simply as:

> Smartcard→Device: $x_3=msg_3$, $RMAC_3$

Since every message from the device contains a running MAC, it is impossible for the smartcard to produce a valid message that contains a forged message from the device. Non-repudiation is achieved if it is assumed that there is no way for the device to generate two messages that map to the same MAC output with different keys. While this is not a proven property of MAC functions such as HMAC, it is widely believed to hold (the smartcard can improve things by including a new random value in every message). Armed with the history of the messages recorded by the device, a user can prove that the device sent and received messages in the order that they occurred.

Protocols for Adding or Removing Value

Figure 5:
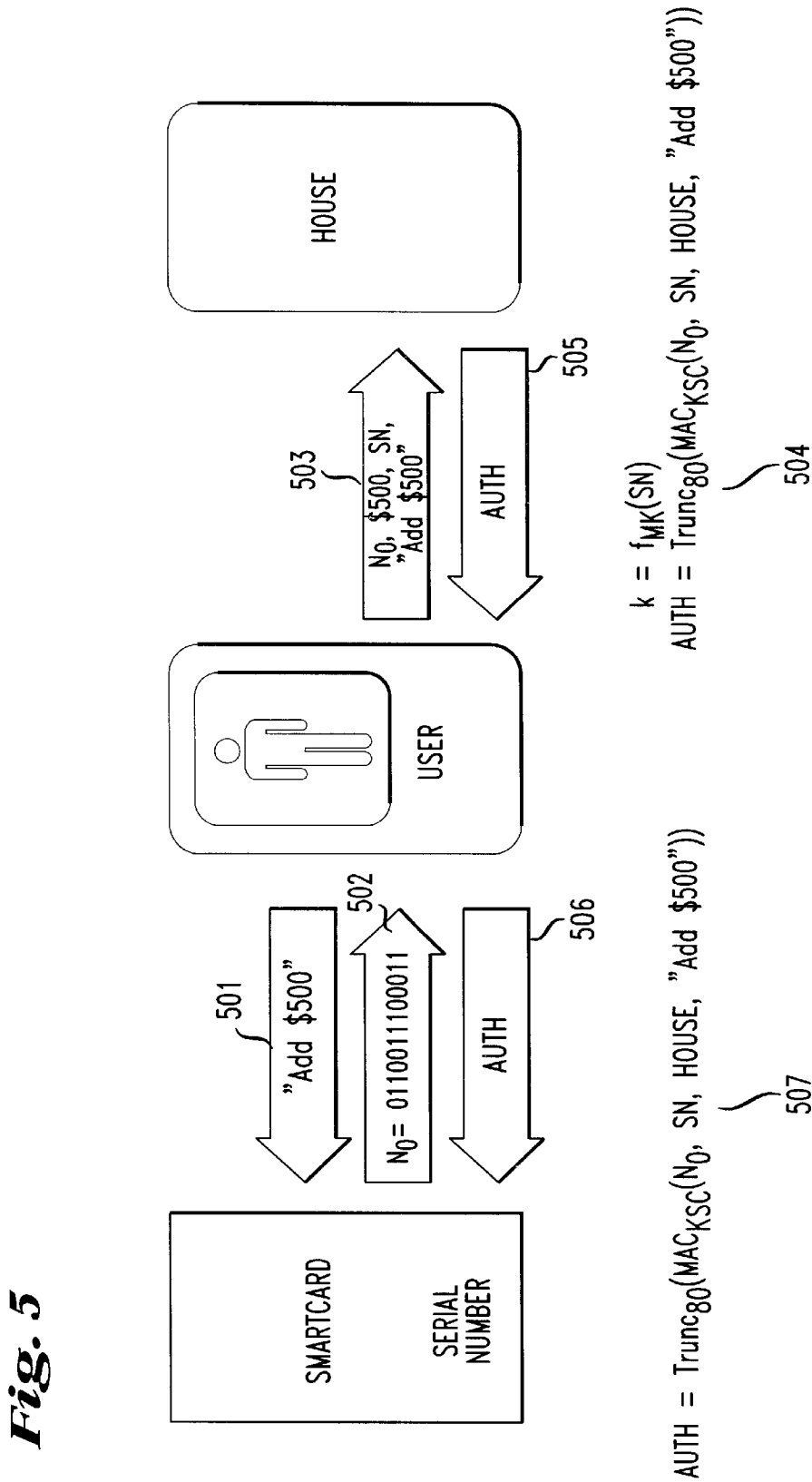

Security protocols can be provided for allowing a user to have the balance on her card increased by paying more money to the house—and for allowing the user remove value or "cash out" the balance on the card. These protocols have clear application beyond the domain of probabilistic transactions. Where there is a high bandwidth channel available between the smartcard and the house, e.g. where the device is equipped with a modem that can dial into the house, value can be added to the smartcard as follows: the user can pay $100, for example, to the house by using a credit card over the telephone or while connected to the Internet. Then, the user would dial the house from the device, and the house would send a signed message to the card to increase the balance by $100. A challenge/response protocol could be used to avoid replay. The smartcard would then verify the signature of the house and increase the balance accordingly. As for cashing out the value of the smartcard, the user can indicate to the house that she wishes to cash out, connect the device up the house, and the smartcard can send a signed message to the house over the modem connection indicating that the user cashes out a particular balance. The smartcard then sets the balance to zero, and the house issues a check for the amount to the user. Measures can easily be taken to protect against replay.

Where there is no direct communication between the device and the house, the protocol illustrated in FIGS. 5 can be utilized to add value to the smartcard. It is assumed that some low bandwidth connection exists between the user and the house and between the user and the smartcard. For example, the user could make a telephone call to the house, enter a credit card number and expiration date, and receive a short string of alphanumeric characters back. The same could readily be accomplished over the Internet. The actual transport does not matter, except for the limiting factor that there is no way for the house or the device to communicate thousands of bits to each other in a user-friendly fashion. Once the user has paid for the credit, a way is needed for the house to add the credit to the smartcard in such a way that the amount is added exactly once, even in the face of a malicious user who is trying to maximize the value of her smartcard. In accordance with an embodiment of the present invention, the smartcard authenticates the request from the house by verifying that only the house could have possibly generated some string. One method of achieving this is by establishing a shared secret between the house and the smartcard. A difficulty is that every smartcard must have a different secret. Otherwise, compromising one smartcard could lead to impersonation of all the other smartcards. On the other hand, it is disadvantageous to store a large number of secret keys at the house.

The solution employed in a preferred embodiment of the present invention is the use of pseudo-random functions. The house generates a master cryptographic key, MK, which it uses to compute the secret keys on the smartcards. Every smartcard, SC, comes with a unique serial number, SN, that is visible on the outside of the card. When a smartcard is manufactured, the house computes a secret key $$K_{SC}=f_{MK}(SN)$$

which is a pseudo-random function keyed by the master key and evaluated at the serial number. It has been shown that desirable pseudo-random properties for f above can be easily constructed from simple hash functions such as HMAC. The secret key, $K_{SC}$, is stored in the tamper-resistant portion of the smartcard. The key need not be saved by the house, since it can be recomputed from the serial number and the master key. Once the shared secret, namely the secret key, is established, messages can be authenticated using a secure MAC, such as HMAC. Thus, messages can be reliably transferred between the house and the smartcard with the user as an intermediary such that only the entities in possession of the secret cryptographic key, namely the house and the smartcard, could have produced the MAC.

As illustrated in FIG. 5, for example, the user at step 501 utilizes the data input means on the device to indicate that she wishes to add $500 to the smartcard. The smartcard, at step 502, issues a challenge consisting of an 80 bit random nonce, No. The nonce can be of any length, although it is preferably at least 80 bits in length which can be represented by 16 alphanumeric characters, which is a reasonable amount for a user to read and convey to the house. Once the smartcard issues the challenge, it locks up and refuses any message except a valid AUTH response corresponding to the amount in the initial message (it is preferable that the card lock up until it receives a correct AUTH from the user to prevent parallel runs of the protocol, which could lead to potential attacks). At step 503, the user pays the house $500. This can be accomplished by credit card, check, cash, or any other form. In addition, she passes along the nonce and the serial number, which she can read off the outside of the smartcard. The entire transaction could take place by telephone if the house is willing to accept credit card payments by phone. Once the house receives the challenge, at step 504, it computes the secret key, Ksc, from the serial number and the master key. It then computes the MAC of the nonce and the request to add $500. The result can then be truncated to contain only the first 80 bits. At step 505, these are then sent to the user as an authorization code AUTH of 16 alphanumeric characters. The user, at step 506, then enters AUTH into the device, which passes it along to the smartcard. The smartcard, at step 507, uses its stored secret key, Ksc, to compute the truncated MAC on the request to add $500 and compares it to the one received from the house. If the computed value does not match the value from the house, then the card remains locked. Otherwise, the balance on the card is increased by $500. The protocol in FIG. 5 can also be represented by the following notation:

User→Smartcard: "Add $500"

Smartcard→User: $N_0$

User→House: $N_0$, SN, $500, "Add $500"

House→User: AUTH=Trunc$_{80}$ (MAC$_{KSC}$($N_0$, SN, House, "Add $500"))

User→Smartcard: AUTH

The messages can be further signed and chained, as described above. Again, the length of the nonce and AUTH can be longer or shorter: shorter lengths may be more susceptible to compromise while longer lengths may be too long for a user to relay comfortably to the house. The above protocol is advantageously not susceptible to replay. To successfully add any amount to the smartcard, the user must receive a new challenge from the smartcard, and the smartcard does nothing until the AUTH for that amount is received. The house only releases AUTH values for the amounts that are paid, so replaying any of the messages in the protocol cannot result in stealing money from the house. An adversary who does not possess the master key cannot produce a valid AUTH for an arbitrary smartcard. Furthermore, if someone breaks into a smartcard, she can only expose the secret key for that particular card, because keys are independent from each other, given the properties of pseudo-random functions. The scheme introduces no further loss than the compromised card: compromising one card does not give one the ability to add value to another card.

Figure 6:
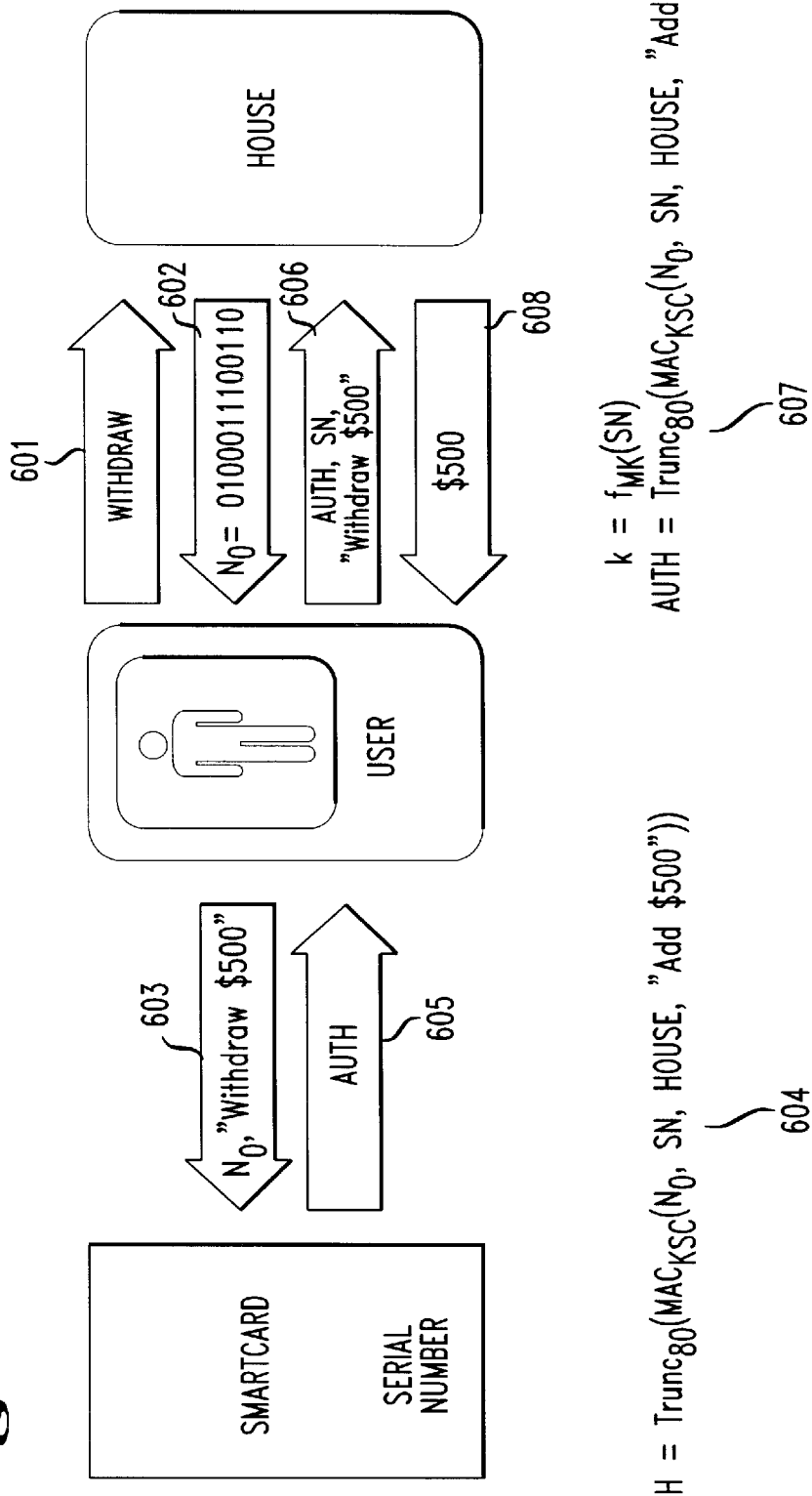

Analogously to FIG. 5, FIG. 6 illustrates a protocol which can be used to cash out the value of the smartcard where there is no direct communication between the device/smartcard and the house. It is again assumed that the bandwidth between the house and the smartcard is limited by a user in the middle of the protocol. Again, the entire transaction can be conducted over a telephone call from the user to the house or over the Internet, etc. At step 601, the user contacts the house and indicates a desire to withdraw money from the smartcard. The house, at step 602, provides a challenge which consists of a random nonce, preferably at least 80 bits in length which can be encoded in 16 alphanumeric characters. The user, at step 603, enters the 16 characters into the device along with the amount to be withdrawn, e.g. $500, which are then fed into the smartcard. The smartcard checks its value; if it does not have $500, it returns an error. Otherwise, the smartcard deducts $500 from the card and constructs a MAC of the challenge and the amount to be withdrawn and truncates this message to 80 bits in order to produce AUTH at step 604. The smartcard transmits the AUTH to the user via the device at step 605, which the user can read to the house at step 606, along with the serial number on the back of the smartcard. The user also indicates that the authorized withdrawal is for $500. The house, at step 607, then constructs the smartcard's secret key, $K_{SC}$, from the serial number and computes the MAC and compares the resulting string to the authorization from the user. If they match, the house then at step 608 mails a check to the user for $500 (or performs a wire transfer or any other form of payment). The cash out protocol example in FIG. 6 can also be represented with the following notation:

User→House: Withdraw

House→User: $N_0$

User→Smartcard: $N_0$, "Withdraw $500"

Smartcard→User: AUTH=$Trunc_{80}$ ($MAC_{KSC}(N_0, SN, House,$ "Withdraw $500"))

User→House: AUTH, SN, "Withdraw $500"

House→User: $500

Again, these protocols work because both the smartcard and the house have access to $K_{SC}$, while nobody else does. In order to ensure that the house is able to refund the amount on the smartcard whenever the user wishes, the house can keep a certain amount of money in escrow, perhaps under the control of an arbiter.

Audit Process

Regardless of the cryptography or protocols utilized in a secure system, it is advantageous to include logging, audit, and other controls in a complete system. For example, it is advantageous for the house to monitor cash out requests very carefully, for example by logging all cash out requests by serial number. In the unlikely event that a particular smartcard is physically compromised, there is a danger that an attacker could attempt to manufacture money. An alarm should be triggered if a particular smartcard requests cash out with frequency or amount above a certain threshold. The suspected serial number should be added to a watch list, and if the behavior continues, an investigation may be required. One countermeasure is to notify the user that the next time she tries to cash out that her card is being replaced. The replaced card should in turn be automatically placed on a hotlist that is closely monitored. Another possible countermeasure is to issue cards with expiration times, which would limit exposure to a valid period. This could, however, lead to the side effect of increasing the take of the house because of money lost to expired smartcards, which may be ill-perceived by users.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description described security protocols as applied to a personalized gambling device used to play high-card. However, the principles of the present invention could be extended to perform other games as well as other types of remote transactions. Such extensions could be readily implemented by one of ordinary skill in the art given the above disclosure.

What is claimed is:

1. A cryptographic module for enabling remote transactions with an untrusted apparatus, the cryptographic module comprising:

means for interfacing to an external untrusted apparatus;

means for storing numbers;

means for generating random numbers;

a processor, connected to the interface means, storage means, and generating means, for executing program instructions, the program instructions causing the processor to perform the steps of:

generating a first random number transmitting the first random number to the untrusted apparatus after the apparatus has generated a second random number;

receiving the second random number from the untrusted apparatus, wherein the first and second random numbers are used by the untrusted apparatus to calculate a third random number to enable probabilistic transactions and wherein the first random number is not transmitted until a commitment number is received which is calculated from knowledge of the second random number.

2. The apparatus of claim 1 wherein the commitment number is calculated based on a first salt random number generated by the cryptographic module, a second salt random number generated by the untrusted apparatus, and the second random number.

3. An apparatus for enabling remote transactions with a cryptographic module, the apparatus comprising:

means for interfacing to a cryptographic module;

means for storing numbers;

means for generating random numbers;

a processor, connected to the interface means, storage means, and generating means, for executing program instructions, the program instructions causing the processor to perform the steps of:

generating a first random number receiving a second random number generated by a cryptographic module; and calculating a third random number based on the first random number and the second random number which are used to enable probabilistic transactions and wherein the second random number is not received until a commitment number is calculated based on the first random number and transmitted to the cryptographic module.

4. The apparatus of claim 3 wherein the commitment number is calculated based on a first salt random number generated by the cryptographic module, a second salt random number generated by the apparatus, and the first random number.

* * * * *

UNITED STATES PATENT AND TRADEMARK OFFICE
CERTIFICATE OF CORRECTION

PATENT NO.     : 6,496,808 B1
DATED          : December 17, 2002
INVENTOR(S)    : William A. Aiello et al.

It is certified that error appears in the above-identified patent and that said Letters Patent is hereby corrected as shown below:

<u>Title page,</u>
Item [57], ABSTRACT,
Line 1, "The present method" replaced with -- The present invention --

<u>Column 1,</u>
Line 38, "weight" replaced with -- weigh --

<u>Column 6,</u>
Line 16, "valued'$_D$" -- replaced with -- value'$_D$ --
Line 45, "fi" replaced with -- if --
Line 66, "valueSC" replaced with -- *value* $_{SC}$ --
Line 66, "1 is i eleventh" replaced with -- 1 is in the eleventh --

<u>Column 7,</u>
Line 39, "any dispute s" replaced with -- any disputes --

<u>Column 10,</u>
Line 43, "Ksc" replaced with -- *K* $_{SC}$ --

<u>Column 12,</u>
Line 46, "generating a first random number transmitting the first random number to the untrusted apparatus after the apparatus has generated a second random number;" replaced with -- generating a first random number --

-- transmitting the first random number to the untrusted apparatus after the apparatus has generated a second random number; --

Signed and Sealed this

Twenty-seventh Day of May, 2003

JAMES E. ROGAN
*Director of the United States Patent and Trademark Office*